(12) United States Patent
Albert et al.

(10) Patent No.: US 10,965,187 B2
(45) Date of Patent: Mar. 30, 2021

(54) MOTOR-TRANSMISSION ARRANGEMENT FOR AN ADJUSTING DEVICE FOR ADJUSTING TWO COMPONENTS ADJUSTABLE RELATIVE TO EACH OTHER

(71) Applicant: IMS Gear SE & Co. KGaA, Donaueschingen (DE)

(72) Inventors: Simon Albert, Bonndorf im Schwarzwald (DE); Matthias Kieninger, Villingen-Schwenningen (DE)

(73) Assignee: IMS Gear SE & Co. KGaA, Donaueschingen (DE)

( * ) Notice: Subject to any disclaimer, the term of this patent is extended or adjusted under 35 U.S.C. 154(b) by 131 days.

(21) Appl. No.: 16/276,874

(22) Filed: Feb. 15, 2019

(65) Prior Publication Data

US 2019/0260265 A1 Aug. 22, 2019

(30) Foreign Application Priority Data

Feb. 19, 2018 (EP) ..................................... 18000165

(51) Int. Cl.
*H02K 7/06* (2006.01)
*H02K 7/116* (2006.01)
(Continued)

(52) U.S. Cl.
CPC .............. *H02K 7/116* (2013.01); *F16H 1/28* (2013.01); *F16H 1/30* (2013.01); *H02K 5/1737* (2013.01)

(58) Field of Classification Search
CPC .......... H02K 7/116; H02K 51/00; H02K 5/04; H02K 5/06; H02K 5/225; H02K 7/003;
(Continued)

(56) References Cited

U.S. PATENT DOCUMENTS 3,239,699 A * 3/1966 Ferrary .................. H02K 7/116
310/83
3,310,691 A * 3/1967 Wilkinson ............. H02K 7/116
310/83
(Continued)

FOREIGN PATENT DOCUMENTS

CN 107317428 11/2017
EP 2166252 3/2010
(Continued)

OTHER PUBLICATIONS

Korean Intellectual Property Office, "Notification of Reason for Refusal," and English translation thereof, issued in Korean Patent Application No. 10-2019-0018627, dated Mar. 27, 2020, document of 17 pages.
(Continued)

*Primary Examiner* — Thanh Lam
(74) *Attorney, Agent, or Firm* — Akerman LLP; Peter A. Chiabotti

(57) ABSTRACT

A motor-transmission arrangement for an adjusting device for adjusting two components adjustable relative to each other can include a planetary gear system having a planetary carrier, a planetary gear with planetary gear toothing and which is rotatably mounted in the planetary carrier and with a ring gear with an internal toothing which engages with the planetary gear toothing. An electric motor can have a motor shaft which can be rotated about a motor shaft axis, which shaft interacts with the planetary gear system, and a housing which is closed with first and second housing covers in which the motor shaft is mounted via a first bearing section and a second bearing section.

15 Claims, 4 Drawing Sheets

(51) Int. Cl.
  *F16H 1/28* (2006.01)
  *H02K 5/173* (2006.01)
  *F16H 1/30* (2006.01)

(58) Field of Classification Search
  CPC ........ H02K 7/083; H02K 7/1166; F16H 1/28;
  F16H 57/082; F16H 1/30; F16H 1/32;
  F16H 2057/0213
  USPC .............................. 310/83, 71, 89–90, 98–99
  See application file for complete search history.

(56) References Cited

U.S. PATENT DOCUMENTS

| | | | |
|---|---|---|---|
| 4,777,847 A | 10/1988 | Pickles | |
| 4,930,590 A * | 6/1990 | Love | B60K 7/0007 180/308 |
| 9,641,039 B2 * | 5/2017 | Smetana | H02K 5/161 |
| 2004/0108778 A1 * | 6/2004 | Tsukamoto | B60L 15/007 310/83 |
| 2005/0046290 A1 * | 3/2005 | Baukholt | H02K 7/116 310/75 R |
| 2013/0269305 A1 | 10/2013 | Wang et al. | |
| 2015/0105206 A1 | 4/2015 | Hagedorn et al. | |
| 2015/0105207 A1 | 4/2015 | Hagedorn et al. | |
| 2015/1005206 | 4/2015 | Hagedorn et al. | |
| 2015/1005207 | 4/2015 | Hagedorn et al. | |
| 2016/0144694 A1 | 5/2016 | Shchokin et al. | |
| 2016/0160560 A1 | 6/2016 | Mazzoni | |
| 2016/0297469 A1 | 10/2016 | Galehr | |
| 2018/0216390 A1 | 8/2018 | Takizawa et al. | |
| 2018/0283076 A1 | 10/2018 | Gorosin et al. | |
| 2019/0154118 A1 | 5/2019 | Koop et al. | |
| 2019/0154138 A1 | 5/2019 | Albert et al. | |
| 2019/0154139 A1 | 5/2019 | Albert et al. | |
| 2019/0257404 A1 | 8/2019 | Albert et al. | |
| 2019/0257411 A1 | 8/2019 | Albert et al. | |

FOREIGN PATENT DOCUMENTS

| | | |
|---|---|---|
| FR | 2429936 | 1/1980 |
| JP | 2016-534263 | 11/2016 |
| JP | 2017-31634 | 2/2017 |
| WO | 2015036328 | 3/2015 |

OTHER PUBLICATIONS

European Patent Office, "European Search Report," issued in European Patent Application No. EP18000165.3, dated Jun. 27, 2018, document of 10 pages.

* cited by examiner

MOTOR-TRANSMISSION ARRANGEMENT FOR AN ADJUSTING DEVICE FOR ADJUSTING TWO COMPONENTS ADJUSTABLE RELATIVE TO EACH OTHER

CROSS-REFERENCE TO RELATED APPLICATIONS

This application claims priority to European Patent Application No. 18 000165.3, filed Feb. 19, 2018, which is incorporated by reference in its entirety.

BACKGROUND

The present application relates to a motor-transmission arrangement for an adjusting device for adjusting two components adjustable relative to each other. Furthermore, the present application relates to an adjusting device as such comprising such a motor-transmission arrangement. In addition, the present application relates to an electric motor, particularly for use in said motor-transmission arrangement. In addition, the present application relates to the use of said motor-transmission arrangement for an adjusting device in vehicles for adjusting two vehicle components that are adjustable relative to each other.

SUMMARY

Adjusting devices in vehicles increasingly comprise auxiliary drives with which two mutually adjustable vehicle components can be moved relative to each other, without requiring that the occupants of the vehicle manually provide the necessary torque. An example of such auxiliary drives are electromechanical actuator arrangements, which are used, among other uses, for operating parking brakes of vehicles. Other auxiliary drives are for example used for longitudinal seat adjustments, tailgate adjustments, window lifters, and sunroof adjustments.

Another application are drives for windows and shutters of buildings, which become increasingly important in the course of increasing digitalization of buildings, which has been termed "smart home."

Auxiliary drives almost without exception utilize electric motors as their power source. The electric motors typically used often rotate at a comparatively high speed, such that high gear reductions are required to be able to adjust vehicle or other components relative to each other with the desired, comparatively slow movement. In addition, the torques delivered by the electric motor are often not sufficient for moving the vehicle or other components, which makes gear reductions necessary for this reason as well.

Available space in vehicles is scarce, such that the electric motor and the transmission used for increasing or reducing gear are combined into a motor-transmission arrangement. Motor-transmission arrangements known from prior art are disclosed, for example, in EP 2 860 336 A2 or in EP 2 860 338 A2, and have proven their worth in practice. But these motor-transmission arrangements need comparatively much axial installation space and have a large number of individual parts.

In one embodiment of the present application a motor-transmission arrangement is provided which requires a shorter axial installation space compared to known motor-transmission arrangements and has a reduced number of individual parts. Furthermore, the disclosure creates an electric motor with which a shortened axial installation space in a motor-transmission arrangement can be implemented. In addition, an adjusting device is provided for adjusting two components that can be adjusted relative to each other, which device can be operated by means of a motor-transmission arrangement having a reduced axial installation space.

An embodiment of the present application relates to a motor-transmission arrangement for an adjusting device for adjusting two components adjustable relative to each other, comprising a planetary gear system having at least one planetary carrier, at least one planetary gear, which is rotatably mounted in said planetary carrier, and a planetary gear toothing, and comprising a ring gear with an internal toothing which is in engagement with the planetary gear toothing, and an electric motor having a motor shaft which can be rotated about a motor shaft axis, which shaft interacts with said planetary gear system, and a housing which is closed with a first housing cover, which cover faces said planetary gear system, wherein said motor shaft is mounted in the first housing cover by means of a first bearing section and in the housing by means of a second bearing section.

The housing of the electric motor must be closed in any case to prevent damage to the electronics and/or the coils and brushes of the electric motor by external influences, such as dust and moisture. According to present disclosure, the housing of the electric motor is closed with a first housing cover, which does not only have a protective effect on the components of the electric motor, but also on the bearing of the motor shaft on the side facing the planetary gear system. Since the first housing cover is integrated in the bearing of the motor shaft, the number of components can be kept low. Particularly, no adapters or similar components are needed to accommodate the bearing of the motor shaft. At the same time, the opportunity arises to implement a short axial installation length of the motor-transmission arrangement. According to the present disclosure, the electric motor and the planetary gear system are integrated into one assembly. The electric motor only becomes operational when the first housing cover is connected to the housing of the electric motor. The electric motor only becomes fully functional when the first housing cover is connected to the housing of the electric motor. The first housing cover thus plays a central part.

According to another embodiment, the housing of the electric motor comprises a second housing cover with which the housing is closed, and the motor shaft is mounted in said second housing cover by means of the second bearing section. The actual housing of the electric motor can be tube-shaped and thus have a very simple configuration. In its initial state, the housing is open at both ends, such that, depending on the manufacturing workflow, the interior of the housing is at least accessible from one side, if required. Manufacturing is kept flexible in this manner.

In an embodiment which is developed further, the first bearing section or the second bearing section can include a roller bearing for radial and axial mounting of the motor shaft. Ball bearings can be used for this purpose, for example; these are available at low cost and provide both axial and radial support. There is no need for using supporting washers, which are required for slide bearings, which means that the number of components can be reduced.

In an embodiment which is developed further, the first housing cover is injection-molded around the roller bearing. In this embodiment, the position of the roller bearing is axially fixed, without requiring a spacer disc or the like. The number of components is reduced. In addition, the roller bearing does not need to be installed in the first housing cover. After removing from the injection-molding tool, the roller bearing is already arranged in the first housing cover.

In an embodiment which is developed further, the ring gear can be connected to the housing cover in a rotationally fixed manner. In this embodiment, the motor-transmission arrangement does not have any rotatable parts on the outside, since the internal helical gear encloses the rotating planetary carrier, which contributes to increasing the operational safety of the motor-transmission arrangement.

In another embodiment, the motor shaft can have a motor shaft toothing which is directly arranged on the motor shaft and which is in engagement with the planetary gear toothing. Since the motor shaft toothing is arranged directly on the motor shaft, the motor shaft itself forms the pinion or sun gear, and no additional component is necessary. Consequently, assembly of the motor-transmission arrangement is made easier in that no pinion or sun gear must be kept in stock and installed. Assembly disruptions due to lacking or defective sun gears or pinions can thus be avoided. In addition, this prevents errors which can occur during fastening of the sun gear or the pinion on the motor shaft.

An embodiment which was developed further is characterized in that the motor shaft toothing has an outer toothing diameter and the motor shaft has a first motor shaft diameter, at least in a first shaft section following the motor shaft toothing, wherein the toothing diameter is smaller than or equal to the first motor shaft diameter. This makes assembly more flexible, since the motor shaft toothing does not represent an obstacle for assembly. Particularly, the supporting washer can be slid onto the motor shaft from both ends. The same applies to the slide bearings. In addition, the increased gear and reduced gear ratios of the planetary gear system can be increased as the toothing diameter decreases.

According to another embodiment, the motor shaft comprises a second shaft section having a second shaft diameter which is smaller than the first shaft diameter. One option, for example, is to arrange the motor shaft toothing on the first shaft section and the second shaft section in such a manner that most of the second shaft section is inside the electric motor. Particularly, the volume needed for the coils of the electric motor increases dramatically with the shaft diameter in the electric motor. The smaller the shaft diameter of the motor shaft in the electric motor, the smaller can the diameter or radial extension of the electric motor be dimensioned, such that the motor-transmission arrangement can be designed in a more compact manner.

Another embodiment is characterized in that the roller bearing is arranged in the first shaft section. Arranging the roller bearing in the first shaft section, which has a greater first shaft diameter, makes it possible to dimension the roller bearing sufficiently, such that the probability of failure during operation of the motor-transmission arrangement is very low.

Another embodiment is characterized in that the motor shaft comprises a first motor shaft portion and a second motor shaft portion, which are connected in a rotationally fixed manner, wherein the first motor shaft portion has a motor shaft toothing which is in engagement with the planetary gear toothing. The entire second motor shaft portion or at least a major part of it passes through the housing of the electric motor, such that a conventional motor shaft which does not require design changes can be used for said second motor shaft portion. Only the first motor shaft portion must be adapted to the toothing geometry of the planetary gear system and, depending on the respective use case, to the type of bearing as well. The first motor shaft portion can be slid onto the second motor shaft portion. The costs for providing the motor-transmission arrangement according to the present disclosure can be kept low in this way.

In another embodiment, the first bearing section can be arranged on the first motor shaft portion. This also saves axial installation space, since no space for the first bearing section must be reserved on the second motor shaft portion.

In another embodiment, the first bearing section is arranged on the second motor shaft portion. This embodiment does require that space for the first bearing section is reserved on the second motor shaft portion, which increases the axial installation length by the width of the first bearing section. But this embodiment gives the motor manufacturer the opportunity to manufacture the electric motor together with the second motor shaft portion mounted in the first housing cover and, depending on the embodiment, in the second housing cover as well, without having to care for the first motor shaft portion. The transmission manufacturer alone can in this embodiment mount the first motor shaft portion onto the second motor shaft portion and produce the meshing of the first motor shaft portion with the planetary gear system.

In another embodiment, the roller bearing is arranged in the first motor shaft portion, and a spacer sleeve is provided between the slide bearing and the ring gear. The spacer sleeve is used for axial bearing, particularly of the outer ring of the roller bearing. The spacer sleeve can be mounted easily.

An embodiment which was developed further is characterized in that the planetary gear system is configured as a helical wheel planetary gear system, wherein the at least one planetary gear is mounted in the planetary carrier for rotation about a planetary gear axis and the planetary gear axis extends askew to a planetary carrier axis. In helical wheel planetary gear systems, the sun gear toothing, in this case the motor shaft toothing, is configured as helical toothing of a helical sun gear and the ring gear is configured as an internal helical wheel. The planetary gear toothing is adapted to the helical toothing of the helical sun gear. The same applies to the internal toothing of the internal helical wheel. In this embodiment, the planetary gear system is similar to so-called coaxial transmissions, as disclosed in WO 2015/036328 A1 and EP 2 166 252 A1.

According to an embodiment which was developed further, the planetary gear system and particularly the helical wheel planetary gear system have a single-stage configuration. Particularly, the helical wheel planetary gear system can have a single-stage configuration. This reduces the complexity of the drive train compared to multistage planetary gear systems, which simplifies manufacturing and reduces the probability of failure and the required installation space. Particularly, the installation space is kept small in the axial direction, which is an important feature, particularly for tailgate adjustment systems. The increased or reduced gear ratios required particularly for tailgate adjustment systems can be provided particularly satisfactorily by helical wheel planetary gear systems.

According to another embodiment, the first housing cover and the ring gear are at least partially surrounded by the housing. The housing is typically tube-shaped and in this embodiment of a sufficient length that the first housing cover is completely arranged in the housing. The ring gear is at least partially arranged in the housing. The first housing cover can be pressed together with the housing, and the ring gear can be crimped with the housing. Laser welding is not necessary. Since the housing at least partially surrounds the planetary gear system in this embodiment, the housing has a sound-insulating effect, which reduces noise.

One aspect of the present disclosure relates to the use of said motor-transmission arrangement according to one of the previous embodiments for an adjusting device in vehicles for adjusting two vehicle components that are adjustable relative to each other.

The technical effects and advantages that can be achieved with the use according to the present disclosure correspond to those explained with respect to the present motor-transmission arrangement. In summary, it should be noted that the number of components and the axial installation length of the motor-transmission arrangement can be reduced according to the present disclosure. The available installation space is particularly scarce in vehicles, such that the reduction of the axial installation length is particularly advantageous here. Reducing the number of components reduces the probability of failure of the adjusting device, and in addition it simplifies logistics and warehousing needed for producing the adjusting device. Furthermore, the assembly is simplified due to the smaller number of components, and the probability of assembly errors is reduced.

According to another useful design, the adjusting device is configured as a tailgate adjustment system. Simplified and error-reduced assembly of the motor-transmission arrangement is particularly leveraged in tailgate adjustment systems, often also called tailgate drives.

One configuration of the present disclosure relates to an electric motor, particularly for use in a motor-transmission arrangement according to one of the embodiments discussed above, wherein the electric motor comprises a motor shaft which can rotate about a motor shaft axis and which interacts with the planetary gear system, and a housing which is closed by the first housing cover, wherein said motor shaft is mounted in the first housing cover by means of a first bearing section and in the housing by means of a second bearing section. In this configuration, the electric motor can be connected to a planetary gear system in such a manner that the resulting motor-transmission arrangement has a short axial installation length.

Another embodiment is characterized in that the housing of the electric motor includes a second housing cover with which the housing is closed, and the motor shaft is mounted in said second housing cover by means of the second bearing section. If two housing covers are provided, the actual housing can be configured in the shape of a tube and thus in a particularly simple manner, and access to the interior of the housing becomes possible from both ends, which increases flexibility in manufacturing.

An implementation of the present disclosure relates to an adjusting device for adjusting two components that can be adjusted relative to each other, including at least one motor-transmission arrangement according to one of the embodiments discussed above. The technical effects and advantages that can be achieved with the adjusting device according to the present disclosure correspond to those explained with respect to the present motor-transmission arrangement. In summary, it should be noted that the number of components and the axial installation length of the motor-transmission arrangement can be reduced. The available installation space is particularly scarce in vehicles, such that the reduction of the axial installation length is particularly advantageous here. Reducing the number of components reduces the probability of failure of the adjusting device, and in addition it simplifies logistics and warehousing needed for producing the adjusting device. Furthermore, the assembly is simplified due to the smaller number of components, and the probability of assembly errors is reduced.

BRIEF DESCRIPTION OF THE DRAWINGS

An exemplary embodiment of the present application will be described with reference to the accompanying figures below. Wherein.

DETAILED DESCRIPTION

Figure 1A:
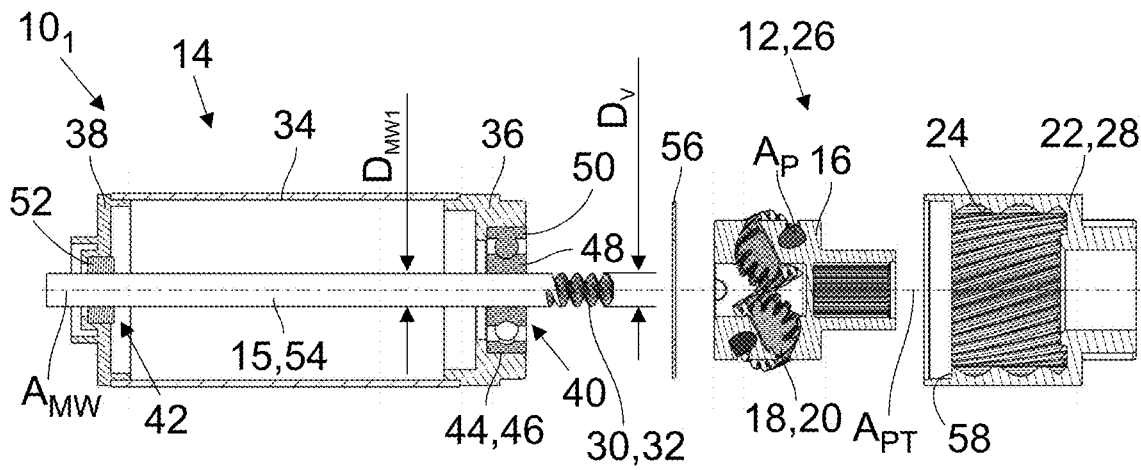
FIG. 1A shows sectional view of a first embodiment of a motor-transmission arrangement according to the present application in a not completely assembled state.
Figure 1B:
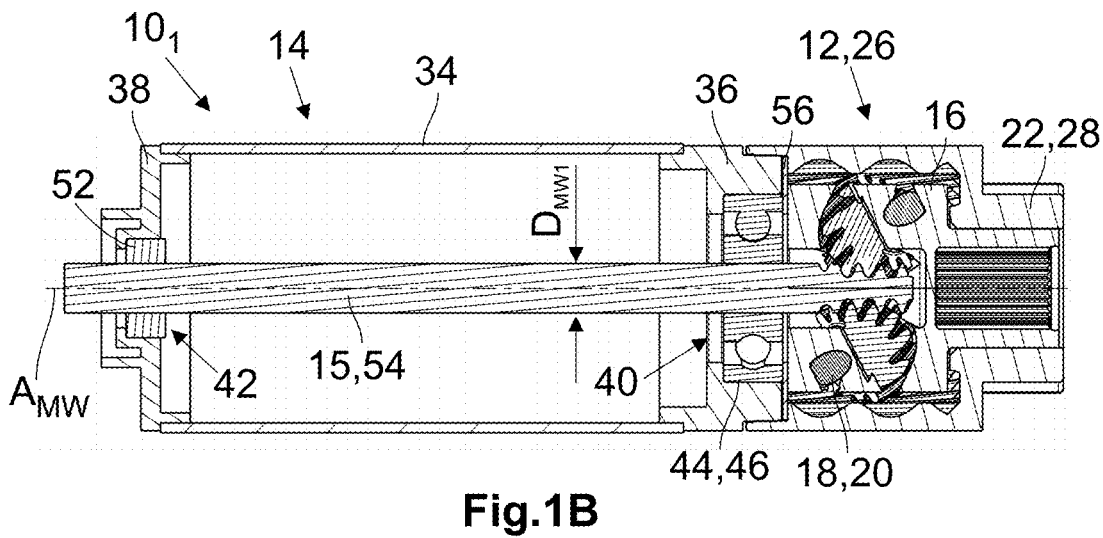
FIG. 1B shows a perspective view of the motor-transmission arrangement shown in FIG. 1A in the completely assembled state.

FIGS. 1A and 1B show a first embodiment of a motor-transmission arrangement $10_1$ according to the present application, once in a not completely assembled state and once in the completely assembled state. The motor-transmission arrangement $10_1$ comprises a planetary gear system 12 and an electric motor 14. The electric motor 14 is equipped with a motor shaft 15, which can be rotated about a motor shaft axis $A_{MW}$.

The planetary gear system 12 comprises a planetary carrier 16, which defines a planetary carrier axis $A_{PT}$ and on which a total of three planetary gears 18 are mounted for rotation about a planetary gear axis $A_P$. The planetary gears 18 have a planetary gear toothing 20. Furthermore, the planetary gear system 12 comprises a ring gear 22 having an internal toothing 24, which is in engagement with the planetary gear toothing 20.

In the embodiment shown, the planetary gear system 12 is configured as a helical wheel planetary gear system 26. In this embodiment, the planetary gear axes $A_p$ run askew to the planetary carrier axis $A_{PT}$. Furthermore, the ring gear 22 is configured as an internal helical wheel 28.

The motor shaft 15 comprises a motor shaft toothing 30 which is directly arranged on the motor shaft 15 and which is configured a helical toothing of a helical sun gear 32. The motor shaft toothing 30 forms one end of the motor shaft 15. The planetary gear toothing 20 and the internal toothing 24 of the internal helical wheel 28 are adapted to the helical toothing of the helical sun gear 32 to ensure engagement as optimally as possible within the helical wheel planetary gear system 26.

The electric motor 14 includes a housing 34, which is closed with a first housing cover 36 and a second housing cover 38. A first bearing section 40 is arranged in the first housing cover 36 and a second bearing section 42 is arranged in the second housing cover 38, which sections support the motor shaft 15 in the housing 34. In the first embodiment, the motor shaft 15 is both radially and axially mounted in the first bearing section 40 by means of a roller bearing 44, in this case by means of a ball bearing 46. The ball bearing 46 comprises an inner ring 48 pressed onto the motor shaft 15 and an outer ring 50 which is in contact with the first housing cover 36. The motor shaft 15 is mounted in the second bearing section 42 by means of a slide bearing 52, for which purpose the slide bearing 52 is pressed onto the motor shaft 15.

The motor shaft 15 has a first shaft section 54 in which the motor shaft 15 has a first motor shaft diameter $D_{MW1}$. The motor shaft toothing 30 has an outer toothing diameter $D_V$. Depending on the selected toothing, the outer toothing diameter $D_V$ can be the outside diameter. In the first embodiment shown, the outer toothing diameter $D_V$ equals the first motor shaft diameter $D_{MW1}$, wherein the outer toothing diameter $D_V$ can also be dimensioned smaller than the first motor shaft diameter $D_{MW1}$. Consequently, the slide bearing 52 and the ball bearing 46 can be slid over the motor shaft toothing 30, or the motor shaft toothing 30 can be passed through the slide bearing 52 and the ball bearing 46.

For connecting the planetary gear system 12 with the electric motor 14, these parts are oriented such that the motor shaft axis $A_{MW}$ and the planetary carrier axis $A_{PT}$ are in alignment with each other. Then the motor shaft 15 with the motor shaft toothing 30 is inserted into the planetary gear system 12 such that the motor shaft toothing 30 is in engagement with the planetary gear toothing 20. The ring gear 22 is connected in a rotationally and axially fixed manner to the first housing cover 36, for example by laser welding. As is particularly visible in FIG. 1A, the motor-transmission arrangement $10_1$ comprises a spacer disc 56 with which the outer ring 50 of the ball bearing 46 is axially fixed. The ring gear 22 has an offset 58 with which the spacer disc 56 is in contact in the assembled state. The spacer disc 56 can be used to limit gear play. The electric motor 34 becomes fully functional only after the first housing cover 36 is mounted to the housing 34.

Figure 2:
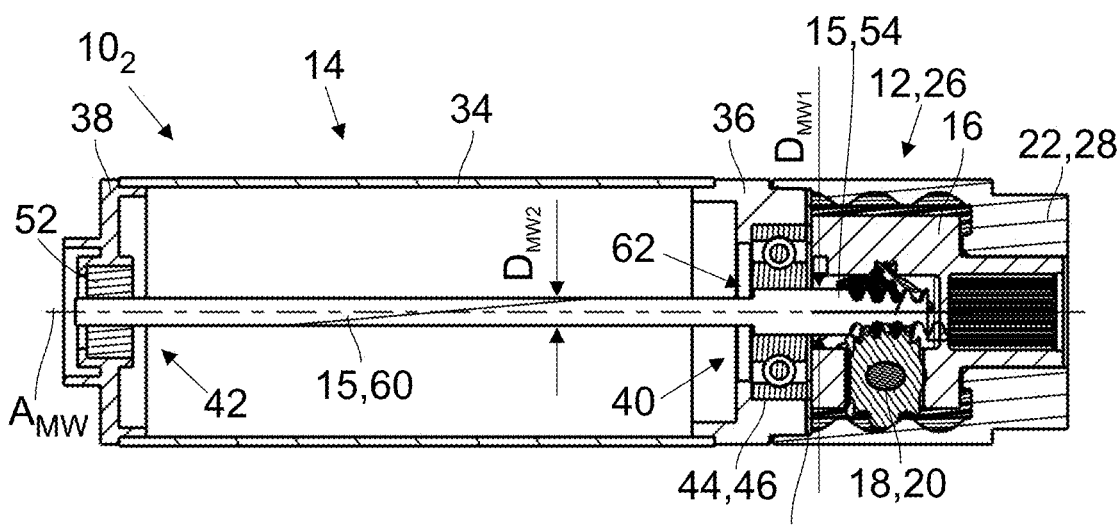
FIG. 2 shows a second embodiment of the motor-transmission arrangement according to the present application.

FIG. 2 shows a sectional view of a second embodiment of the motor-transmission arrangement $10_2$ according to the present disclosure. The general structure of the motor-transmission arrangement $10_1$ according to the second embodiment is similar to the motor-transmission arrangement $10_1$ according to the first embodiment, but the motor shaft 15 has a second shaft section 60 with a second motor shaft diameter $D_{MW2}$ in addition to the first shaft section 54. The second motor shaft diameter $D_{MW2}$ is smaller than the first motor shaft diameter $D_{MW1}$, such that the motor shaft 15 forms a step 62. The ball bearing 46 is arranged in the first shaft section 54, whereas the slide bearing 52 is arranged in the second shaft section 60. The end of the ball bearing 46 that faces the interior of the housing 34 is approximately flush with the step 62. The second shaft section 60 passes through almost the entire housing 34.

Figure 3:
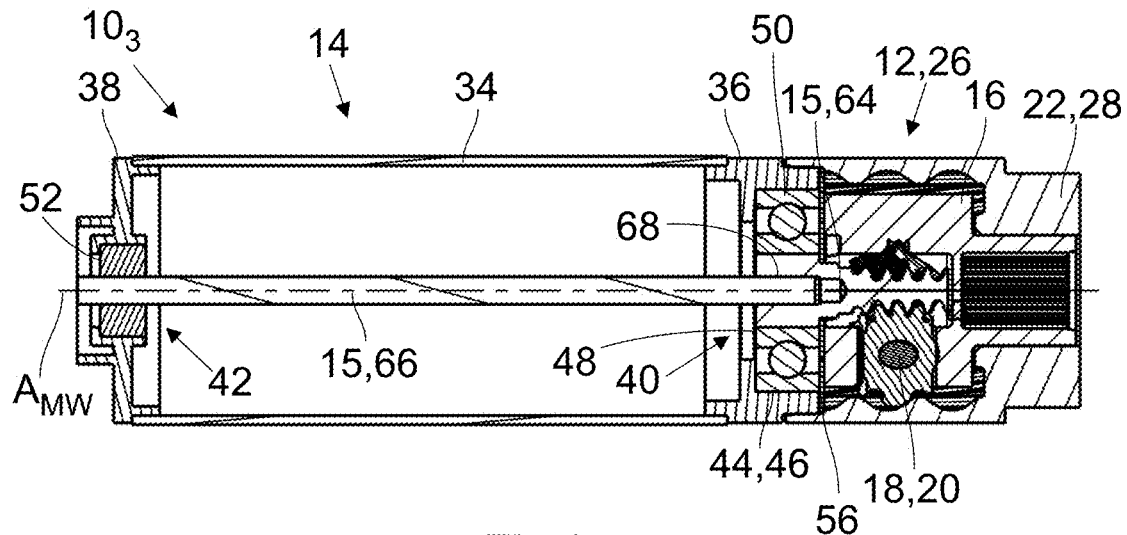
FIG. 3 shows a third embodiment of the motor-transmission arrangement according to the present application.

FIG. 3 shows a sectional view of a third embodiment of the motor-transmission arrangement 103 according to the present disclosure. The motor shaft 15 comprises a first motor shaft portion 64 and a second motor shaft portion 66, which are connected in a rotationally fixed manner. For this purpose, the first motor shaft portion 64 forms a receiving section 68 into which the second motor shaft portion 66 is inserted. The motor shaft toothing 30 is arranged in the first motor shaft portion 64. The first motor shaft portion 64 has a greater diameter in the receiving section 68 than at the site where the motor shaft toothing 30 is arranged. The inner ring 48 of the ball bearing 46 is pressed onto the first motor shaft portion 64, such that the first bearing section 40 is arranged on the first motor shaft portion 64. The end of the ball bearing 46 that faces the interior of the housing 34 is approximately flush with the motor shaft portion 64. The second motor shaft portion 66 passes through almost the entire housing 34.

Figure 4:
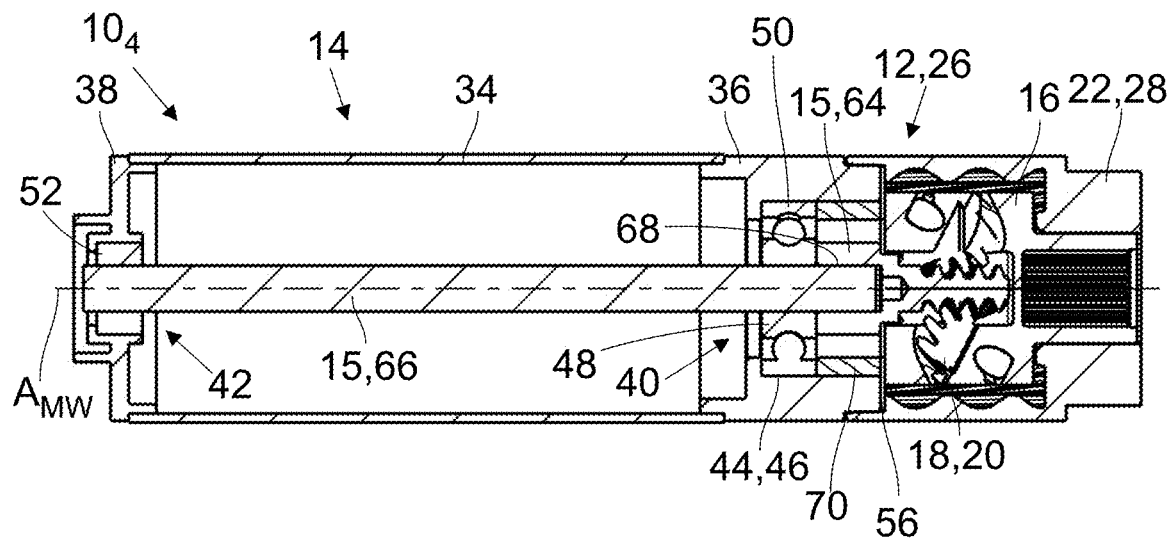
FIG. 4 shows a sectional view of a fourth embodiment of a motor-transmission arrangement according to the present application, each in the completely assembled state.

FIG. 4 shows a sectional view of a fourth embodiment of the motor-transmission arrangement 104 according to the present disclosure, in which the motor shaft 15 also comprises the first motor shaft portion 64 and the second motor shaft portion 66. In this embodiment, however, the first bearing section 40 is not arranged on the first motor shaft portion 64 but on the second motor shaft portion 66. The inner ring 48 of the ball bearing 46 is pressed onto the second motor shaft portion 66 and is in contact with the first motor shaft portion 64. A spacer sleeve 70 is used to bridge the distance between the outer ring 50 and the spacer disc 56. Compared to the third embodiment of the motor-transmission arrangement 103 according to the present disclosure, the diameter of the second motor shaft portion 66 is greater in the fourth embodiment of the motor-transmission arrangement 104 according to the present disclosure.

Figure 5:
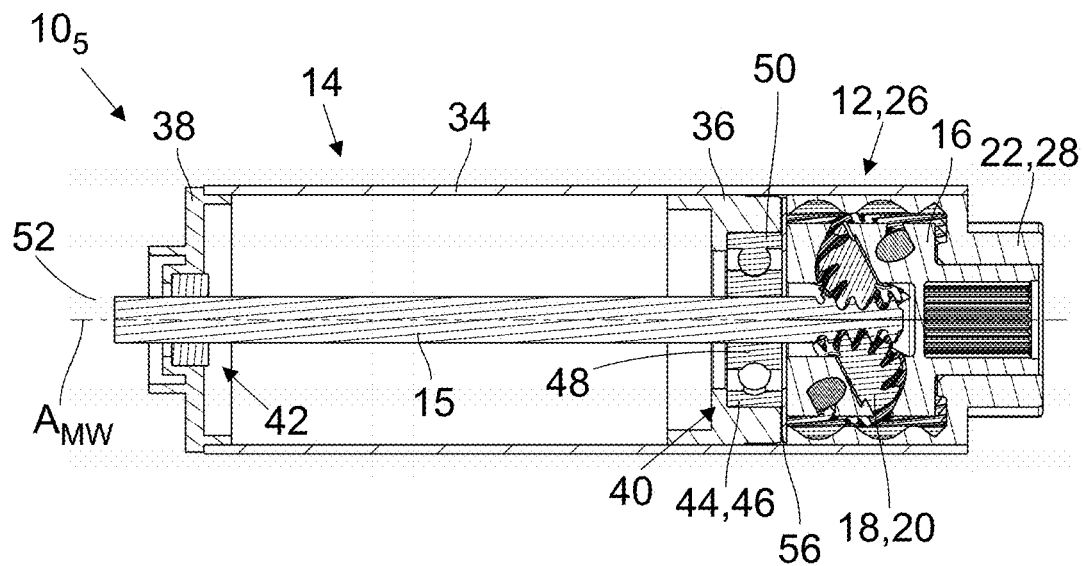
FIG. 5 shows a sectional view of a fifth embodiment of a motor-transmission arrangement.

FIG. 5 shows a sectional view of a fifth embodiment of the motor-transmission arrangement 105 according to the present disclosure in the assembled state. In this embodiment, the housing 34 is clearly longer in the axial direction than in the other embodiments, such that the first housing cover 36 can completely be arranged inside the housing 34. In addition, the ring gear 22 is also partially arranged in the housing 34. The first housing cover 36 can be pressed into the housing 34. The spacer disc 56 is in contact with the outer ring 50 of the ball bearing 46. The ring gear 22 is inserted into the housing 34 until the ring gear 22 is in contact with the spacer disc 56. Then the ring gear 22 and the housing 34 can be connected, for example by crimping.

Figure 6:
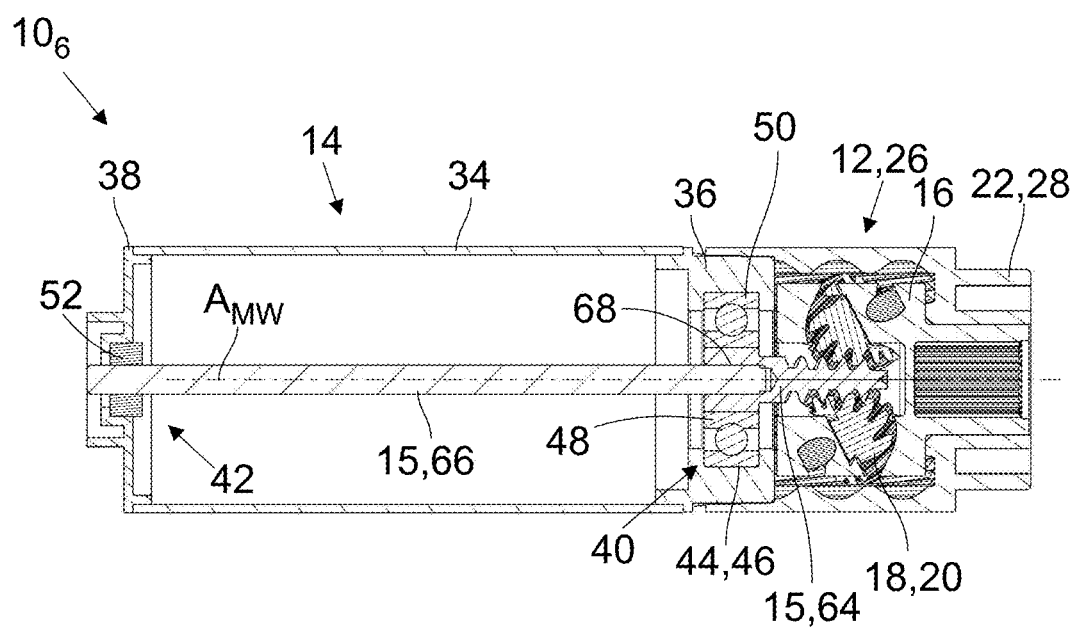
FIG. 6 shows a sectional view of a sixth embodiment of a motor-transmission arrangement, each in the completely assembled state.

FIG. 6 shows a sixth embodiment of the motor-transmission arrangement $10_6$ according to the present disclosure. The roller bearing 44 is arranged on the first motor shaft portion 64. Furthermore, the first housing cover 36 is injection-molded around the roller bearing 44.

In all embodiments of the motor-transmission arrangement 10, the two bearing sections 36, 38 are arranged in the housing 34 of the electric motor 14, such that no bearing must be arranged in the planetary carrier 16, which simplifies assembly.

The outer toothing diameter $D_V$ is not shown in FIGS. 2 to 6 for presentation reasons. The explanations given with respect to the toothing diameter $D_V$ when discussing the first embodiment of the motor-transmission arrangement $10_1$ apply likewise to the second to sixth embodiment of the motor-transmission arrangement $10_2$-$10_6$.

The embodiments $10_1$-$10_6$ lead to other combination options, which have not been explicitly discussed, but which can easily be derived from these embodiments. For example, the spacer sleeve 70 shown in FIG. 4 can also be used when the motor shaft 15 is made in one piece. Also, the housing 34 shown in FIG. 5, which fully surrounds the first housing cover 36 and at least partially surrounds the ring gear, can be used regardless of the design of the motor shaft 15.

Figure 7:
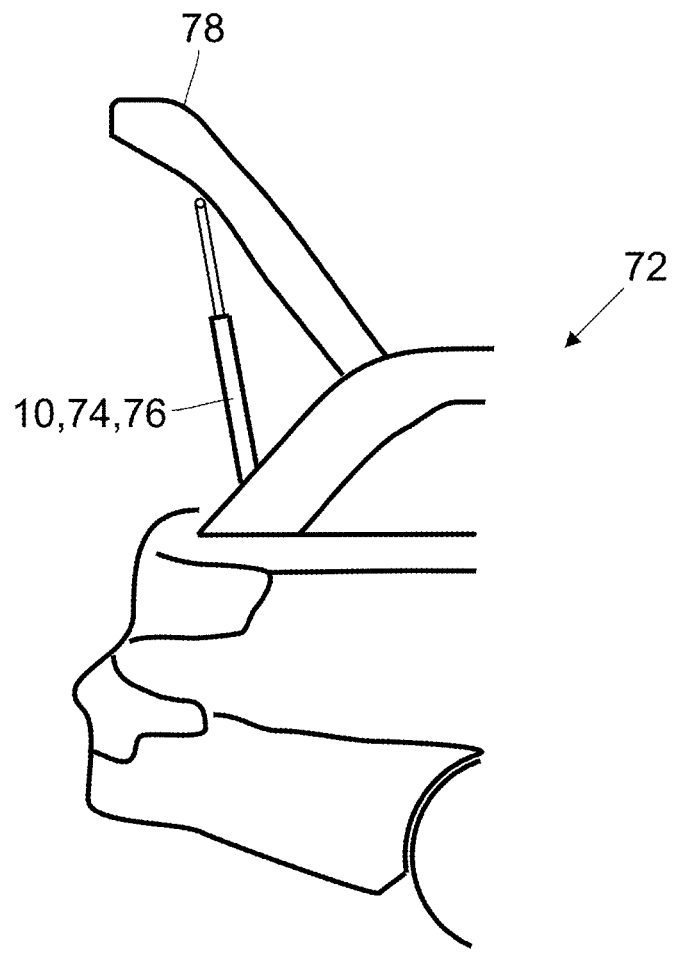
FIG. 7 shows a schematic of an adjusting device in a vehicle.

FIG. 7 shows a schematic side view of a portion of a vehicle 72, which comprises an adjusting device 74 for adjusting two vehicle components that can be adjusted relative to each other. In this case, the adjusting device 74 is configured as a tailgate adjusting device 76 with which a tailgate 78 of the vehicle 72 can be adjusted relative to the rest of the vehicle 72 and thus be opened and closed. The tailgate adjustment system 76 comprises a motor-transmis-

LIST OF REFERENCE SYMBOLS

10, $10_1$-$10_6$ Motor-transmission arrangement
12 Planetary gear system
14 Electric motor
15 Motor shaft
16 Planetary carrier
18 Planetary gear
20 Planetary gear toothing
22 Ring gear
24 Inner toothing
26 Helical wheel planetary gear system
28 Internal helical wheel
30 Motor shaft toothing
32 Helical sun gear or helical toothing, respectively
34 Housing
36 First housing cover
38 Second housing cover
40 First bearing section
42 Second bearing section
44 Roller bearing
46 Ball bearing
48 Inner ring
50 Outer ring
52 Slide bearing
54 First shaft section
56 Spacer disc
58 Offset
60 Second shaft section
62 Step
64 First motor shaft portion
66 Second motor shaft portion
68 Receiving section
70 Spacer sleeve
72 Vehicle
74 Adjusting device
76 Tailgate adjustment system
78 Tailgate
$A_{MW}$ Motor shaft axis
$A_{PT}$ Planetary carrier axis
$A_P$ Planetary gear axis
$D_{MW1}$ First motor shaft diameter
$D_{MW2}$ Second motor shaft diameter
$D_V$ Outer toothing diameter

The invention claimed is:

1. A motor-transmission arrangement, comprising:
   a planetary gear system comprising:
     a planetary carrier;
     a planetary gear mounted for rotation in the planetary carrier about a planetary gear axis ($A_p$) and comprising a planetary gear toothing;
     a ring gear having ring gear internal toothing which engages with the planetary gear toothing; and
   an electric motor comprising:
     a motor shaft, which can be rotated about a motor shaft axis and which interacts with the planetary gear system;
     a motor housing comprising a first motor housing cover, wherein the first motor housing cover faces the planetary gear system;
   wherein the motor shaft is mounted in the first motor housing cover by a first bearing section and also in the motor housing by a second bearing section;
   wherein the motor housing of the electric motor further comprises a second motor housing cover with which the motor housing is closed, and the motor shaft is mounted in the second motor housing cover by the second bearing section; and
   wherein the planetary carrier abuts against the first housing cover with an abutting surface, and wherein neither the planetary gear nor the planetary gear axis protrudes beyond the abutting surface.

2. The motor-transmission arrangement according to claim 1, wherein the first bearing section, the second bearing section, or both the first bearing section and the second bearing section, comprise a roller bearing for radial and axial mounting of the motor shaft.

3. The motor-transmission arrangement according to claim 2, wherein the first motor housing cover is injection-molded around the roller bearing.

4. The motor-transmission arrangement according to claim 1, wherein the ring gear is connected in a rotationally fixed manner to the first motor housing cover.

5. The motor-transmission arrangement according to claim 2, wherein the motor shaft has a motor shaft toothing which is directly arranged on the motor shaft and which engages with the planetary gear toothing.

6. The motor-transmission arrangement according to claim 5, wherein the motor shaft toothing (has an outer motor shaft toothing diameter and the motor shaft has a first motor shaft diameter, at least in a first shaft section following the motor shaft toothing, wherein the motor shaft toothing diameter is smaller than or equal to the first motor shaft diameter.

7. The motor-transmission arrangement according to claim 6, wherein the motor shaft has a second shaft section having a second shaft diameter which is smaller than the first shaft diameter.

8. The motor-transmission arrangement according to claim 7, wherein the roller bearing is arranged in the first shaft section.

9. The motor-transmission arrangement according to claim 1, wherein the motor shaft has a first motor shaft portion and a second motor shaft portion, which are connected in a rotationally fixed manner, wherein the first motor shaft portion has a motor shaft toothing which engages with the planetary gear toothing.

10. The motor-transmission arrangement according to claim 9, wherein the first bearing section is arranged on the first motor shaft portion.

11. The motor-transmission arrangement according to claim 9, wherein the first bearing section is arranged on the second motor shaft portion.

12. The motor-transmission arrangement according to claim 11, wherein the roller bearing is arranged in the first motor shaft portion and a spacer sleeve is provided between the roller bearing and the ring gear.

13. The motor-transmission arrangement according to claim 1, wherein the planetary gear system is configured as a helical wheel planetary gear system, wherein the planetary gear is mounted in the planetary carrier for rotation about a planetary gear axis and the planetary gear axis extends askew to a planetary carrier axis.

14. The motor-transmission arrangement according to claim 1, wherein the first motor housing cover is completely surrounded and the ring gear is at least partially surrounded by the housing.

15. A motor-transmission arrangement, comprising:
   a planetary gear system comprising:
     a planetary carrier;

a planetary gear mounted for rotation in the planetary carrier and comprising a planetary gear toothing;
a ring gear having ring gear internal toothing which engages with the planetary gear toothing; and an electric motor comprising:
a motor shaft, which can be rotated about a motor shaft axis and which interacts with the planetary gear system;
a motor housing comprising a first motor housing cover, wherein the first motor housing cover faces the planetary gear system; and
wherein the motor shaft is mounted in the first motor housing cover by a first bearing section and also in the motor housing by a second bearing section;
wherein the motor housing of the electric motor further comprises a second motor housing cover with which the motor housing is closed, and the motor shaft is mounted in the second motor housing cover by the second bearing section;
wherein the motor shaft has a first motor shaft portion and a second motor shaft portion, which are connected in a rotationally fixed manner, wherein the first motor shaft portion has a motor shaft toothing which engages with the planetary gear toothing, and wherein the first bearing section is arranged on the first motor shaft portion.

* * * * *